United States Patent [19]

Forberg et al.

[11] Patent Number: 4,634,209
[45] Date of Patent: Jan. 6, 1987

[54] MODULAR PLUG CONNECTOR

[75] Inventors: Horst Forberg; Gunter Hegner; Peter Achtnig; Bernd Delakowitz, all of Berlin, Fed. Rep. of Germany

[73] Assignee: Krone GmbH, Berlin, Fed. Rep. of Germany

[21] Appl. No.: 745,319

[22] Filed: Jun. 14, 1985

Related U.S. Application Data

[63] Continuation-in-part of Ser. No. 442,561, Nov. 18, 1982, abandoned.

[30] Foreign Application Priority Data

Jan. 22, 1982 [DE] Fed. Rep. of Germany ....... 3201894

[51] Int. Cl.[4] .................. H01R 3/00; H01R 13/74
[52] U.S. Cl. .................. 339/147 R; 339/14 R; 339/125 R; 339/198 P; 361/119
[58] Field of Search ............ 361/119; 339/34, 125 R, 339/97, 98, 176 M, 198 P, 147 R, 14 R

[56] References Cited

U.S. PATENT DOCUMENTS

| | | | |
|---|---|---|---|
| 4,066,317 | 1/1978 | Bierenfeld et al. | 339/98 X |
| 4,066,320 | 1/1978 | Goodrich et al. | 339/98 |
| 4,328,524 | 8/1982 | Nozick | 361/119 |
| 4,406,510 | 9/1983 | Debortoli et al. | 339/125 R |

Primary Examiner—Eugene F. Desmond
Attorney, Agent, or Firm—Baker, Maxham & Jester

[57] ABSTRACT

A modular plug connector with dual terminals for multiple wire conductor pairs, such as 20 conductors in 10 double pairs. The connector has a plurality of connection modules, a plurality of slide-in units and a wire guide insert in optional arrangements. This design permits the provision of individual functions for each of a plurality of pairs of wire conductors (each double terminal) and also mixed loading of the plug-in connector. Upon occurrence of errors it is possible to indicate error status for two respective wire conductors to a central unit by means of a slide-in unit.

29 Claims, 18 Drawing Figures

MODULAR PLUG CONNECTOR

CROSS REFERENCE TO RELATED APPLICATION

This is a continuation-in-part of application Ser. No. 442,561, filed Nov. 18, 1982, now abandoned.

FIELD OF THE INVENTION

This invention relates generally to multi-conductor cable connectors for communications systems and more particularly to a modular connector in completed and in kit form used in trunk distribution systems, the modular connector having termination versatility and the ability to provide error status indications to a remote central unit.

BACKGROUND OF THE INVENTION

This invention has arisen out of the task to design conventional plug connectors so as to be easier and quicker to assemble, less expensive, provide maximum contact safety and space-saving while permitting mixed operation with different functions of pairs of wire conductors combined in a 10-double terminal connector with individual error status indication.

In particular it has not previously been possible to equip a plug connector for 10 double terminals with different connecting functions for each respective pair of wire conductors and to indicate the occurring error conditions via signal means to a central unit.

SUMMARY OF THE INVENTION

The subject matter of the invention, by which the above-specified object is solved, is a plug connector including, for example, 20 wire conductors for communication apparatus, especially for use in trunk distribution systems. The plug connector is of modular kit design and, if required, is composed of a jumper wire connection module for termination of outgoing conductors or jumper wires, an incoming connection module for the termination of incoming conductors and a ground module for the termination of signal and ground lines and functioning also and alternatively as a wire pre-arranging device for the incoming wires. The connector also comprises a plurality of mutually interchangeable slide-in units, each for a pair of wire conductors, with functions adapted to the respective circuit connection task.

Apart from the normally rigid through-connection of a pair of wire conductors which it provides, the specified functions of the modular plug connector comprise especially the slide-in units with over-voltage and current protection devices as well as the inclusion of an external conductor breaking means and a tap contact for measuring and test connections, if this is required. In the case of the plugging slide-in units comprising over-voltage and current protection devices, the through-connection will be disconnected and grounded in case of error and an error satus indication takes place by means of a pair of contacts in the slide-in unit.

Basically, the incoming and the jumper connection modules are of identical design. They may, if desired, be equipped for each cable conductor with stripless, solderless and non- screwed single or double terminals having a polytropic air gap. These are known in the trade as LSA-PLUS terminals. This designation originates from the German "Lot-, schraub-und abisolierfreier Kontakt mit polytropem Luft-spalt." Double terminals will be used when, for instance, switching operations are to be performed on the side of the outgoing wire conductors without an interruption of the existing route. Further, the use of double terminals allows the connection and disconnection of two jumper wires per contact independently from each other. This is employed in the jumper wire module which is employed for the through-connecting feature of the apparatus.

For a time saving assembly and disassembly, both the incoming and the jumper connection modules are provided with latching means which permit detachable mounting in a trough-like receiving panel or back mount frame which is equipped with a cable conductor sorting means.

This modular plug connector can be usefully employed in several combinations of elements. For simple termination interconnection, the ground module and the incoming wire connection module may be employed with the back mount frame and slide-in units in various of their configurations. Alternatively, the ground module and the jumper wire connection module can be employed with the wire guide insert for through connection. Some configurations which require jumper wires would also employ the outgoing wire connector module.

BRIEF DESCRIPTION OF THE DRAWING

The objects, advantages and features of this invention will be more readily understood from the following detailed description, when read in conjunction with the accompanying drawing, in which.

DESCRIPTION OF THE PREFERRED EMBODIMENTS

Figure 12:
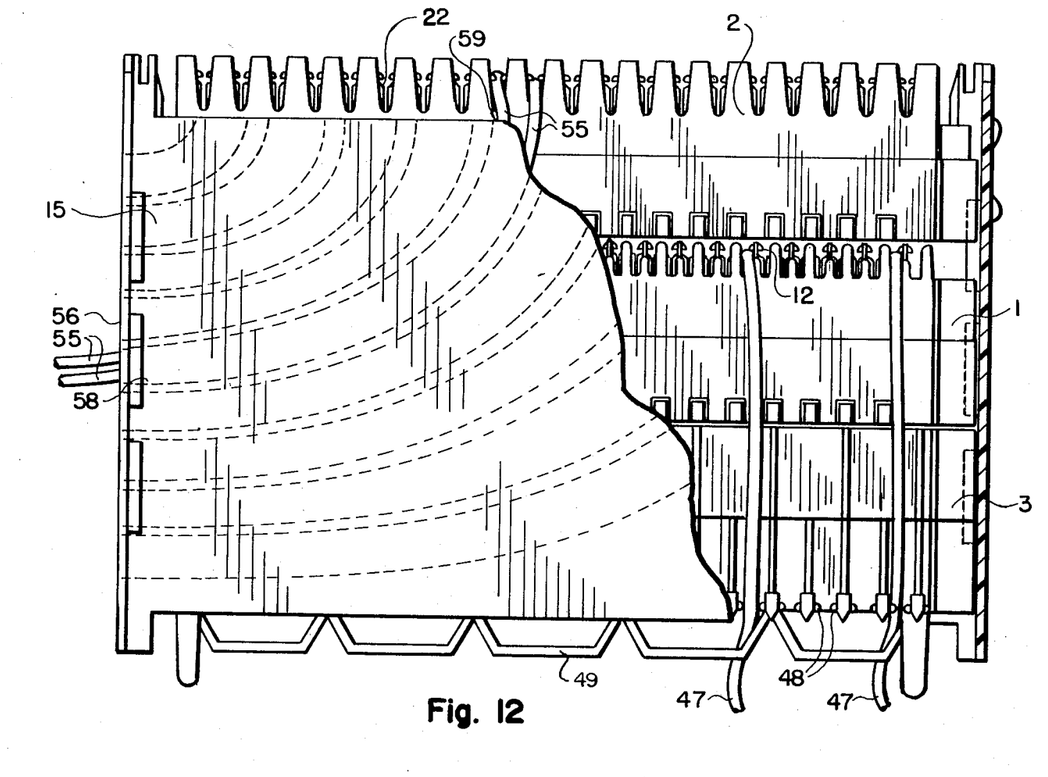
FIG. 12 is a view of the opposite side of the complete modular assembly of FIG. 1.
Figure 13:
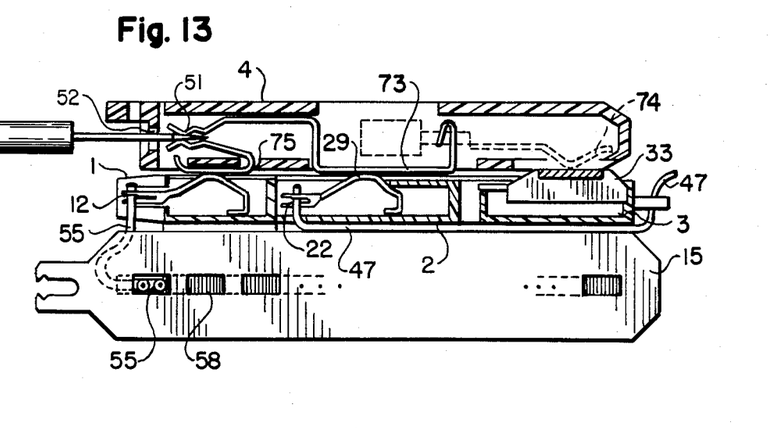
FIG. 13 is an edge, partial sectional view of the complete modular assembly.
Figure 17:
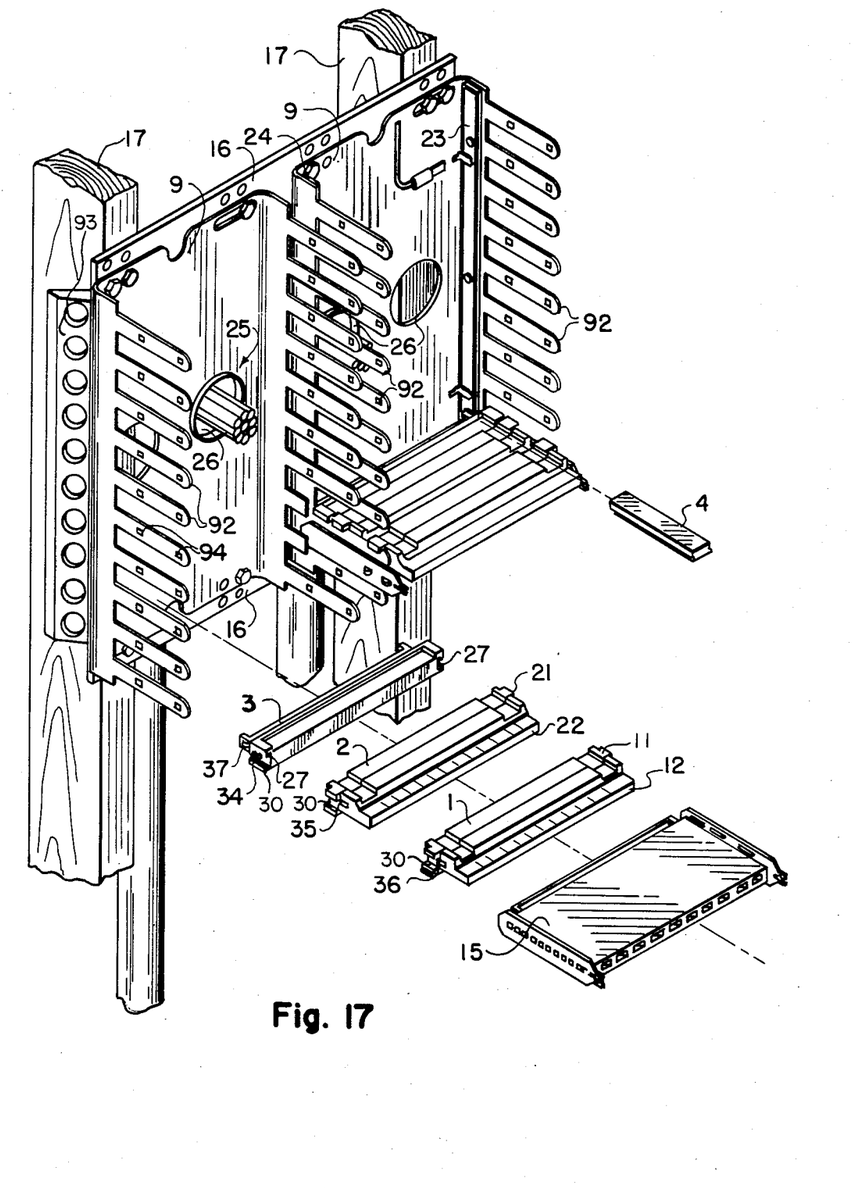
FIG. 17 is a partially assembled, partially exploded view of a multiple assembly including two back mount frames and the connector elements of the present invention.

With reference now to the drawing, and more particularly to the assembly and partially exploded view of FIG. 17, the invention can be readily understood. Two back mount frames 9 are mounted to interconnecting frame bars 16 which in turn mounts to frame members 17. Thus the two back mount frames may be only a very small portion of a very large communications installation. Each of frames 9 are formed with a multiplicity of tabs 92 having openings 94 which are adapted to receive the locking members of spring loaded latches on the modules. Frame 9 may be fitted with one or more printed circuit boards 23, 24 which can have appropriate connection, not shown, to external signal sources to provide signal planes or busses to the various connection block assemblies. A bundle of cable wires 25, each comprising a plurality of cable wire pairs, enters the area of connection block assemblies on frames 9 through openings 26 in the base of the frame. These incoming wires are then routed to an throughout a connection block as shown in FIGS. 12 and 13. Jumper wires are organized and sorted into bundles by sorting means 93 along the side of Frame 9.

The following description is for a complete assembly adapted for all possible interconnection purposes. It should be noted that various combinations of elements may be employed to provide connectors for different specified uses. Ground module 3 is shown mounted to frame 9 with slots or grooves 27 engaging tabs 92. As will be discussed hereinbelow, interconnections can be made by this module to ground and signal planes, and the wires are individually routed along the external surface of this module. Incoming wire connection module 2 is shown mounted also to tabs 92 on top of module 3. Latching means 21 includes a slot or groove similar to groove 27 of module 3, and a spring loaded latch member 35. When module 2 is mounted to frame 9, latch member 35 engages the lower of openings 94 in tab 92 to provide disengageable assembly. Similarly, outgoing or jumper wire connection module 1 is mounted to frame 9 with latching means 11, and is fitted with spring loaded latch member 36 engaging the top opening 94 in the tabs. When through-connection jumper wires are used, wire guide insert 15 is slidingly engaged with modules 1, 2 and 3 to facilitate handling and the easy insertion of the jumper wires. Tabs 19 form slots 20 (FIGS. 7 and 8) on opposite ends, to receive slideable connector means 30 on the ends of each of the modules. Finally, one of single-pair insert slide-in units 4 is shown ready for insertion into slots in modules 1, 2 and 3 in the right hand portion of FIG. 17. These inserts have several different embodiments and are adapted for simple through-connection between modules, for disconnection ability, protection against over-voltage or over-current or thermal overload, to provide testing of any contact pair or any of the above functions. The combinations of several of the elements adapted to be mounted to the frame may be referred to as a connector block. It should be noted that the incoming wires and the through-connection jumper wires are terminated and connected to the connection block of this invention quickly and safely without soldering, screwing or wire-stripping of any of the wire conductors.

Figure 1:
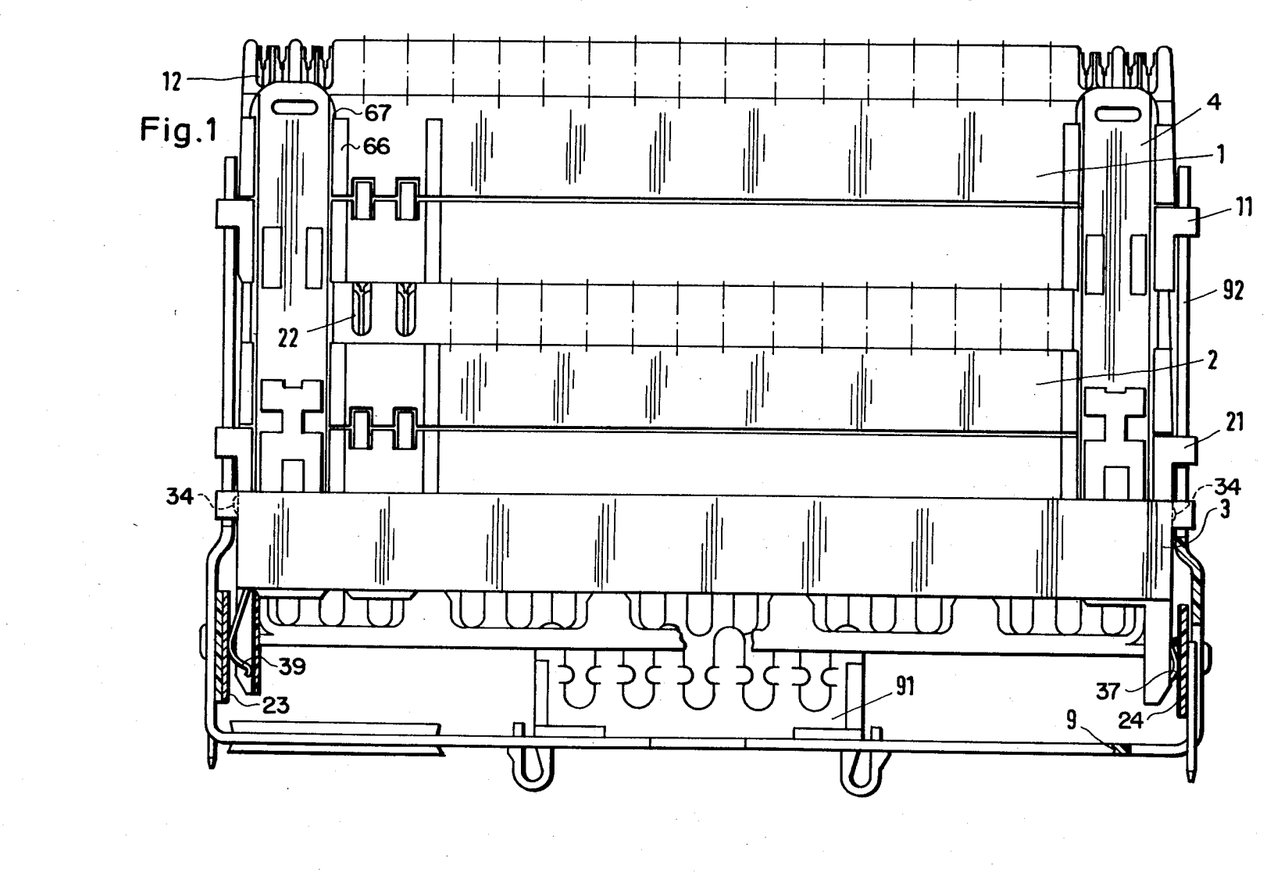
FIG. 1 is a side view of the complete modular plug connector of this invention.

FIG. 1 shows the contact side of the connection block mounted to frame 9. Frame 9 is shown in end view with the modules slidingly engaged on tabs 92. Printed circuit boards 23 and 24 are mounted on the lower, opposite inner faces of the frame, and module 3, having slots engaging the frame tabs is mounted so that contacts 34 at either end of the module come in contact with tabs 92 for electrical ground purposes. Spring loaded elements 37 and 39 are the external connections for the signal lines and appropriate external signals can be brought in to printed circuit boards 23 and 24 to provide electrical signals or bias voltages to module 3. Cable conductor sorting means 91, somewhat different from that shown in FIG. 17, is mounted to frame 9 and keeps the smaller groups of cables separated as they are led to various of the connector blocks. As was shown in FIG. 17, modules 1 and 2 are mounted above module 3 on frame 9 with latching means 11 and 21 engaging tabs 92.

Each of modules 1, 2 and 3 is formed with a plurality of grooves 67, defined by tongues 66 (see FIG. 10), which are aligned when the modules are arranged in the connection block form mounted to the frame. Examples of slide-in units 4 are shown slidingly engaging these grooves of all three modules providing interconnection between the electrical contacts of these modules. As will be explained below, there are several such slide-in units having different configurations but all having similar external characteristics whereby they couple the modules together.

Figure 2:
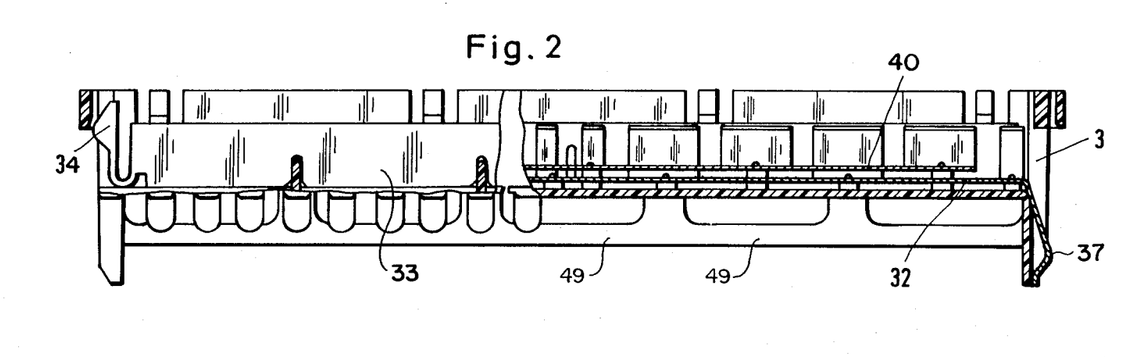
FIG. 2 is a side, partially sectional view, of the ground module of FIG. 1.
Figure 2A:
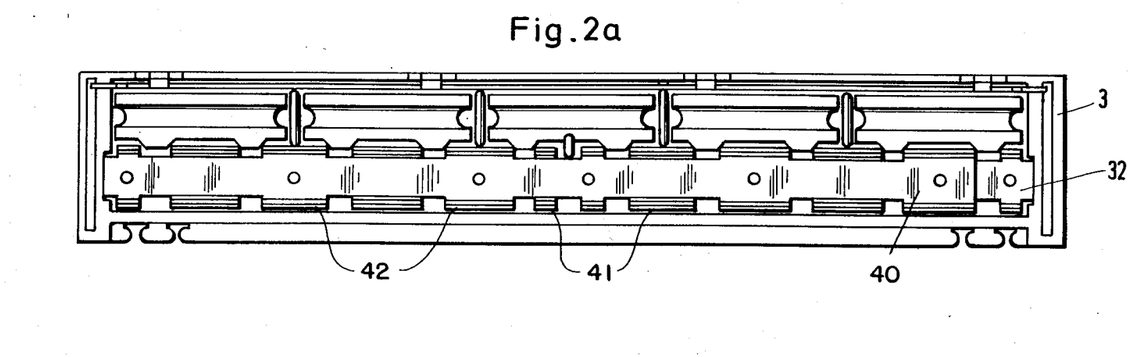
FIG. 2a is a plan view of the module of FIG. 2.

The ground module 3 is shown in FIGS. 2 and 2a. Ground line 33 extends the length of the module and provides external contact with frame 9 by means of the spring loaded contacts 34, one of which is shown in FIG. 2. A portion of the ground line is broken away to reveal signal lines 32, 40 having respective spring loaded end contacts 37 and 39 (FIG. 1). As can be seen from the top view of module 3 in FIG. 2a, signal planes 32 and 40 have respective exposed side contact surfaces 41 and 42 for engagement by appropriately arranged contacts on the slide-in units. Ground plane 33 is easily formed with contact surfaces which extend between surfaces 41 and 42, also to be engaged by appropriate contact elements of the slide-in units. Because the ground line is removed in FIG. 2a, the exact configuration of the contacting surfaces is not shown but the particular shape thereof is not part of the invention.

Figure 3:
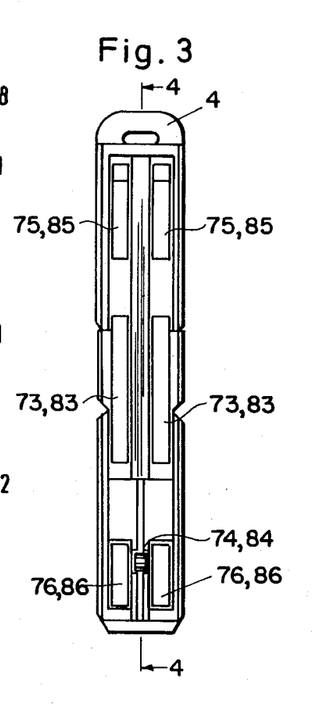
FIG. 3 is a side view of a slide-in unit shown in FIG. 1.
Figure 4:
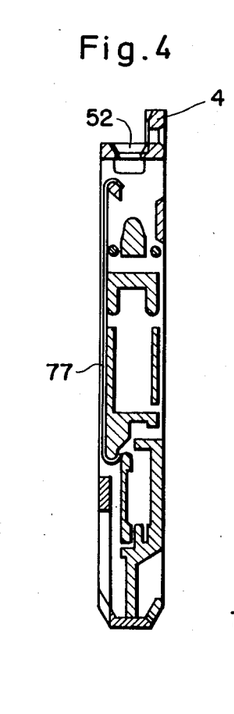
FIG. 4 is a sectional view taken along cutting plane 4—4 of FIG. 3 showing the basic construction of the plastic body of the slide-in unit with one through connector.
Figure 5:
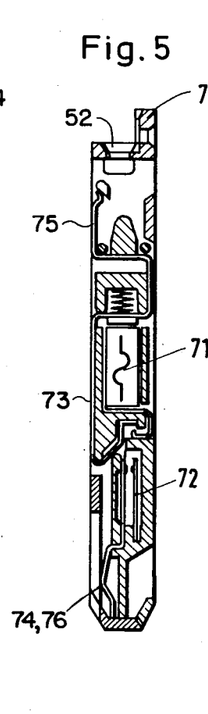
FIG. 5 is a sectional edge view similar to FIG. 4 of one embodiment of a slide-in unit with specific contact elements.

Various aspects of the slide-in units are shown in FIGS. 3-6. The contact surface side of unit 4 is shown in FIG. 3 having ground contacts 74, 84 at the bottom, contacts 73, 83 in the middle for making electrical contact with the contact pairs of module 2, and contacts 75, 85 near the top for making electrical contact with terminals of module 1. On either side of ground contacts 74, 84 may be arranged signal contacts 76, 86. It should be noted that module 3 may be formed only with a ground line, and no signal lines. In that instance, contacts 76, 86 need not be included in the slide-in units. FIG. 4 shows the basic configuration of slide-in unit 4 in section with a single through contact 77. The slide-in unit is made such that, with appropriately shaped metal elements, it can be adapted for a number of different functions. An example of these are shown in FIG. 5, where unit 7 is formed with over-voltage protection means 71 and appropriate contacts 73, 74, 75 and 76 on the side adapted to face modules 1, 2 and 3. A pair of contacts 72 provide for disconnection of electrical continuity under certain circumstances and error indication.

Figure 6:
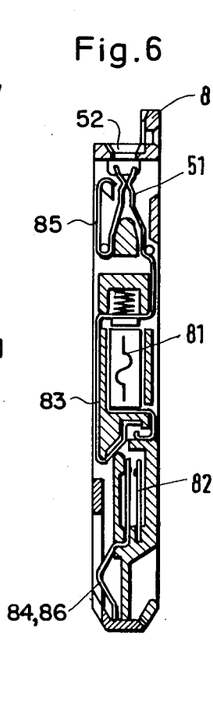
FIG. 6 is a sectional edge view similar to FIG. 4 showing a different embodiment of a slide-in unit with another contact element arrangement.
Figure 7:
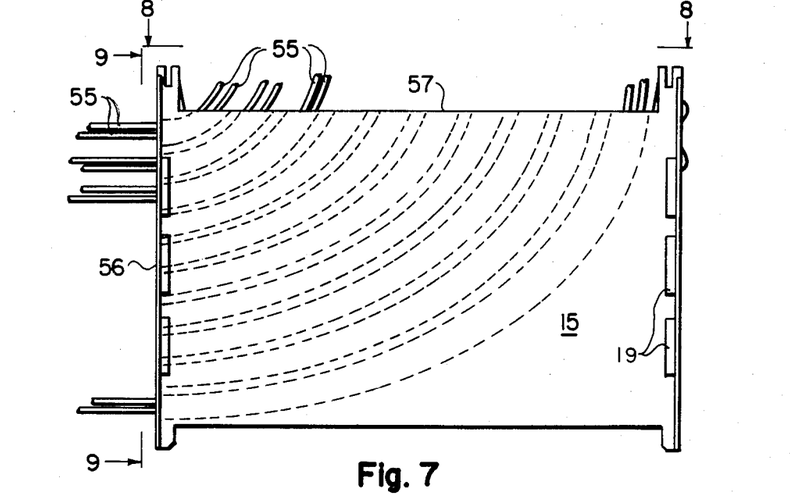
FIG. 7 is a side view of the wire guide insert.
Figure 8:
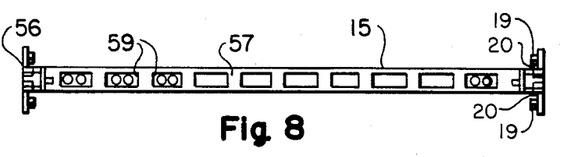
FIG. 8 is a top view of the wire guide insert taken on plane 8—8 of FIG. 7.
Figure 9:
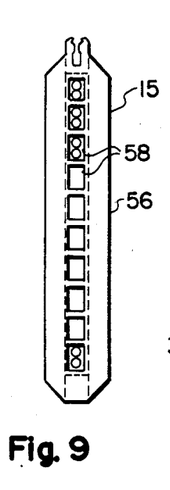
FIG. 9 is an end view of the wire guide insert taken on plane 9—9 of FIG. 7.

In FIG. 6, slide-in unit 8 is formed with an over current protection device 81, a pair of disconnection terminals 82 and externally accessible contacts 83, 84, 85 and 86, very similar to the contacts in unit 7. Additionally, opening 52 is provided in the top for access to tap contact and contact breaking means 51. When functioning as a tap contact, a conductive probe (FIG. 13) inserted through opening 52 makes contact with the electrically conductive elements within unit 7. Alternatively, if an insulative probe is inserted through opening 52, it would separate contacts 51 thereby acting as a contact breaking means and disconnecting the circuity of the terminals of module 1 from modules 2 and 3. Protection devices 71, 81 could also function as thermal overload protection devices if desired FIGS. 7-9 show wire guide insert 15 with several pairs of jumper wires 55 extending into openings 58 in edge 56 and exiting from openings 59 in top surface 57.

Figure 10:
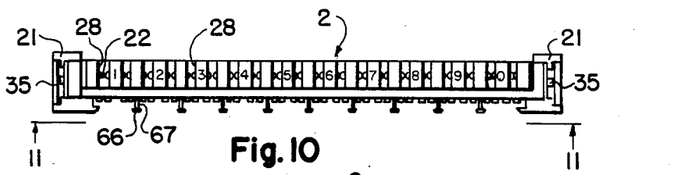
FIG. 10 is a top view of the incoming wire connection module shown in FIG. 1.
Figure 11:
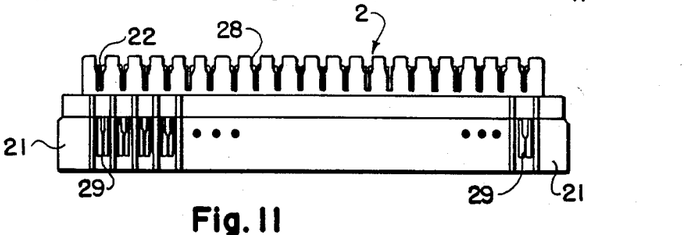
FIG. 11 is a side view of the module of FIG. 10.

Module 2 is shown in FIGS. 10 and 11. Wire engaging terminals 22, accessible in top slots 28, are integral with contact portions 29 which are exposed and accessible at the side of the module. As stated previously, incoming wires are engaged with contacts 22 and slide-in units 7, 8 are selectively formed with contact surfaces (73, 83) to engage contacts 29. Latching elements 35 are also shown in the end slots in latching means 21 of module 2.

FIG. 12 shows the opposite side of the connector block from that shown in FIG. 1. Also, modules 1 and 2 are interchanged in position to shown the modularity of the invention. Insulated wires 47 are fed through the wire pre-arranging portion at the bottom of module 3 comprising bails 49 and closely adjacent tabs 48 forming a slot to receive the wires. These wires are then guided generally upwardly along identations on the sides of modules 3 and 1, where they are then electrically and physically connected with terminals 12 in module 1. Jumper wires 55 extend through curved slots in wire guide insert 15, better shown in FIG. 7, from the left edge as shown in FIG. 12, the exit at the top whereupon they make contact with terminals 22 in module2.

FIG. 13 is an end, partial sectional view of the assembled contact block shown in FIGS. 1 and 12. The relationships of wires and connector elements are clearly shown here.

Figure 14:
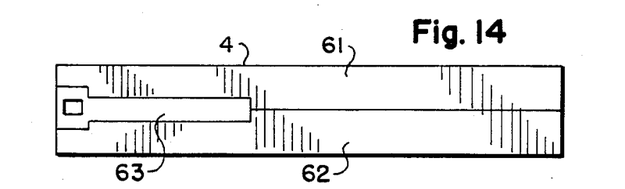
FIG. 14 is an outward facing side view of one of the slide-in units.
Figure 15:
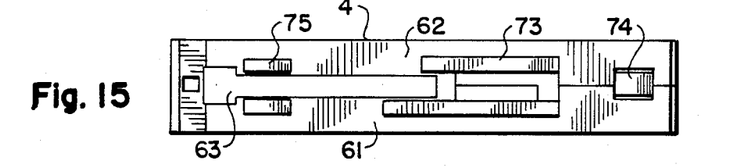
FIG. 15 is a side view of the opposite side of the slide-in unit of FIG. 15.
Figure 16:
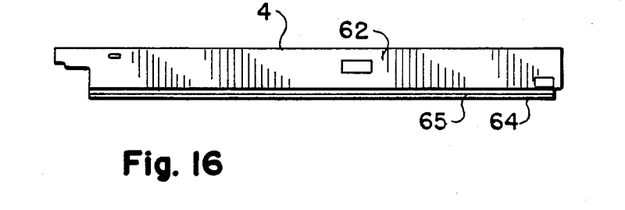
FIG. 16 is an edge view of the slide-in unit of FIG. 15.

The details of a slide-in unit 4 are shown in FIGS. 14-16. The unit is made of two substantially similar side elements 61 and 62 and a center element 63. These elements are made of electrically insulative material, typically some form of rigid plastic. In FIG. 15, contact elements 73, 74 and 75 are shown. In FIG. 16, body element 62 is shown formed with tongue 64 and groove 65 adapted to fit with mating tongue 66 and groove 67 of a connector module (1, 2 or 3), as shown in FIGS. 1 and 10.

It is likely that in view of the above description, modifications and improvements to the invention may be made by those skilled in the art, which are within the scope of the appended claims.

What is claimed is:

1. A modular plug connector for a multiplicity of cable conductor wires for communication apparatus, particularly for use in trunk distribution systems, said plug connector being adapted to be mounted to a back mount frame having at least one oppositely disposed pair of upstanding tabs, said connector comprising:
   an elongated ground module formed with slot means and first slideable connector means at either end, each said slot means being adapted to slidingly engage one of said frame tabs, said ground module further being formed with wire guide means for receiving and guiding said conductor wires;
   an elongated jumper wire connection module formed with slot means and second slideable connector means at either end, each said slot means being adapted to slidingly engage one of said frame tabs, said jumper wire connection module being positioned adjacent said ground module on said frame;
   a multiplicity of first termination elements in said jumper wire connection module, each said termination element comprising a stripless, solderless, non-screwed terminal for each said cable wire; and
   a wire guide insert having a plurality of guide means, each guide means being adapted to receive a pair of jumper wires, said wire guide insert being formed with third slideable connector means on opposite ends, said third slideable connector means being shaped and configured to slidingly engage said first and second slideable connector means, whereby said wire guide insert interconnects said ground and jumper wire connection modules;
   said first termination elements also comprising a stripless, solderless, non-screwed terminal for connection to each jumper wire independently of said cable wires.

2. The modular plug connector recited in claim 1, wherein said slot means of said jumper wire connection module includes latching means to releasably latch said jumper wire connection module to said tabs of said back mount frame.

3. The modular plug connector recited in claim 1, and further comprising printed circuit board means mounted to at least one side of said back mount frame below said tabs to provide external electrical signals;
   said ground module including at least one signal line and a ground line independent of each other, said ground line having means for electrically connecting to said back mount frame upon mounting of said ground module thereto and having means for connecting said signal line to said printed circuit board when said ground module is mounted to said back mount frame.

4. The modular plug connector recited in claim 1, wherein said ground module is further formed with wire arranging means to guide bundles of wires and individual wire guide means for receiving and guiding individual wires.

5. The modular plug connector recited in claim 1, and further comprising:
   a plurality of elongated slide-in units formed with fourth slideable connector means on opposite long edges and having a plurality of electrical contact means on one side thereof;
   said jumper wire connection module being formed with a plurality of fifth slideable connector means transversely arranged on one side thereof, said first termination elements being externally accessible between adjacent said fifth connector means;
   said ground module being formed with a like plurality of sixth slideable connector means transversely arranged on one side thereof, said ground module having electrical ground terminal means externally accessible between adjacent said sixth connector means;

whereby said slide-in units interconnect said ground and jumper wire connection modules and makes selective electrical connection with said ground terminal means and said first termination elements.

6. The modular plug connector recited in claim 5, wherein at least one of said slide-in units comprises means for functioning as a through connector.

7. The modular plug connector recited in claim 5, wherein at least one of said slide-in units comprises means for functioning as a disconnection device.

8. The modular plug connector recited in claim 5, wherein at least one of said slide-in units comprises means for functioning as an over-voltage protection device.

9. The modular plug connector recited in claim 5, wherein at least one of said slide-in units comprises means for functioning as an over-current protection device.

10. The modular plug connector recited in claim 5, wherein at least one of said slide-in units comprises means for functioning as a thermal over-load protection device.

11. The modular plug connector recited in claim 5, wherein at least one of said slide-in units comprises means for functioning as an external test jack receptacle device.

12. The modular plug connector recited in claim 1, and further comprising:
an elongated incoming wire connection module formed with slot means and seventh slideable connector means at either end, each said slot means being adapted to slidingly engage one of said frame tabs, said incoming wire connection module being selectively positioned adjacent said ground module and said jumper wire connection module;
a multiplicity of second termination elements in said incoming wire connection module, each said second termination element comprising a stripless, solderless, non-screwed terminal for each incoming wire;
said third slideable connector means on said wire guide insert being shaped and configured to slidingly engage said seventh slideable connector means, whereby said wire guide insert interconnects said ground, incoming wire connection and jumper wire connection modules.

13. The modular plug connector recited in claim 12, and further comprising:
a plurality of elongated slide-in untis formed with fourth slideable connector means on opposite long edges and having a plurality of electrical contact means on one side thereof;
said jumper wire connection module being formed with a plurality of fifth slideable connector means transversely arranged on one side thereof, said first termination elements being externally accessible between adjacent said fifth connector means;
said ground module being formed with a plurality of sixth slideable connector means transversely arranged on one side thereof, said ground module having electrical ground terminal means externally accessible between adjacent said sixth connector means;
said incoming wire connection module being formed with a plurality of eight slideable connector means transversely arranged on one side thereof, said second termination elements being externally accessible between adjacent said eight connector means;

whereby said slide-in units interconnect said ground, incoming wire connection and jumper wire connection modules and make selective electrical connection with said ground terminal means, said first termination elements and said second termination elements.

14. The modular plug connector recited in claim 13, wherein at least one of said slide-in units comprises means for functioning as a through connector.

15. The modular plug connector recited in claim 13, wherein at least one of said slide-in units comprises means for functioning as a disconnecting device.

16. The modular plug connector recited in claim 13, wherein at least one of said slide-in units comprises means for functioning as an over-voltage protection device.

17. The modular plug connector recited in claim 13, wherein at least one of said slide-in units comprises means for functioning as an over-current protection device.

18. The modular plug connector recited in claim 13, wherein at least one of said slide-in units comprises means for functioning as a thermal over-load protection device.

19. The modular plug connector recited in claim 13, wherein at least one of said slide-in units comprises means for functioning as an external test jack receptacle device.

20. The modular plug connector recited in claim 12, wherein said slot means of said incoming wire connection module and said jumper wire connection module are each formed with latch means to releasably latch said wire connection modules to said tabs of said back mount frame.

21. The modular plug connector recited in claim 12, and further comprising printed circuit board means mounted to at least one side of said back mount frame below said tabs to provide external electrical signals;
said ground module including at least one signal line and a ground line independent of each other, said ground line having means for electrically connecting to said back mount frame upon mounting of said ground module thereto and having means for connecting said signal line to said printed circuit board when said ground module is mounted to said back mount frame.

22. The modular plug connector recited in claim 12, wherein at least some of said slide-in units are formed with normally closed contact means providing disconnectable through-connection of two wire conductors from said incoming wire connection module to said jumper wire connection module.

23. The modular plug connector recited in claim 12, wherein at least some of said slide-in units are adapted to provide positive through-connection between two wire conductors from said incoming wire connection module to said jumper wire connection module.

24. The modular plug connector recited in claim 12, and further comprising:
over-voltage protection means in a least one of said slide-in units;
said slide-in unit being adapted to provide disconnectable through-connection of two wire conductors from said incoming wire connection module to said jumper wire connection module by means of said over-voltage protection means.

25. The modular plug connector recited in claim 24, wherein at least one of said slide-in units further comprises a pair of contacts for error status indication.

26. The modular plug connector recited in claim 3, and further comprising:
   current protection means in at least one of said slide-in units;
   said slide-in unit being adapted to provide disconnectable through-connections of two wire conductors from said incoming wire connection means to said jumper wire connection means by means of said current protection means.

27. The modular plug connector recited in claim 15, wherein said slide-in unit further comprises a pair of contacts for error status indication.

28. A kit of parts for making a modular plug connector, said kit having component parts capable of being assembled in the field to a back mount frame having at least one oppositely disposed pair of upstanding tabs, said connector, when assembled to said frame, providing connection for a multiplicity of cable conductors for communication apparatus, particularly for use in trunk distribution systems, said connector, when assembled, providing interconnection between incoming and jumper cable wires and providing individual access to terminals for each of said wires, said kit comprising the combination of:
   an elongated ground module formed with slot means, first slideable connector means at either end, and fifth slideable connector means transvesely arranged on one side thereof, each said slot means being adapted to slidingly engage one of said frame tabs, said ground module further being formed with wire guide means for receiving and guiding wires along one side of said ground module, said ground module having electrical ground terminal means externally accessible between adjacent said fifth slideable connector means, said ground module being adapted to provide ground interconnection to said back mount frame when said ground module is positioned on said back mount frame;
   an elongated incoming wire connection module formed with slot means, second slideable connector means at either end, and sixth slideable connector means transversly arranged on one side thereof, each said slot means being adapted to slidingly engage one of said frame tabs, said incoming wire connection module being adapted to be positioned adjacent said ground module on said frame;
   an elongated jumper wire connection module formed with slot means, third slideable connector means at either end, and seventh slideable connector means transversely arranged on one side thereof, each said slot means being adapted to slidingly engage one of said frame tabs, said jumper wire connection module being adapted to be selectively positioned adjacent said ground module and said incoming wire connection module;
   a multiplicity of first termination elements in said incoming wire connection module, each said termination element comprising a stripless, solderless, non-screwed terminal for each said cable wire, said first termination elements being externally accessible between adjacent said sixth slideable connector means;
   a multiplicity of second termination elements in said jumper wire connection module, each said second termination element comprising a stripless, solderless, non-screwed terminal for each said cable or jumper wire, said second termination elements being externally accessible between adjacent said seventh slideable connector means;
   a wire guide insert having a plurality of guide means, each said guide means being adapted to receive a pair of jumper wires, said wire guide insert being formed with eighth slideable connector means on opposite ends, said eighth slideable connector means being shaped and configured to slidingly engage said first, second and third slideable connector means, whereby said wire guide insert is adapted to selectively interconnect said ground, incoming wire connection and jumper wire connection modules; and
   a plurality of elongated slide-in units formed with fourth slideable connector means on opposite long edges and having a plurality of electrical contact means on one side thereof;
   each said slide-in unit being adapted to slidingly engage the respective fifth, sixth and seventh slideable connector means on said ground, incoming wire connection and jumper wire connection modules to selectively interconnect said modules and make selective electrical connection with said ground terminal means, and said first and second termination elements.

29. The modular plug connector kit recited in claim 28 wherein said kit further comprises:
   at least one slide-in unit having over-voltage protection means therein;
   at least one slide-in unit having over-current protection means therein;
   at least one slide-in unit having thermal over-load protection means therein;
   at least one slide-in unit having means to selectively disconnect said first and second terminal elements;
   at least one slide-in unit having test jack receiving means; and
   at least one slide-in unit providing positive through-connection of wire conductors from said incoming wire connection module to said jumper wire connection module.

* * * * *